Sept. 12, 1933.    J. MAYO    1,926,593
LEER STACKER
Filed May 1, 1931    5 Sheets-Sheet 1

INVENTOR
John Mayo
By Green & McCallister,
His Attorneys

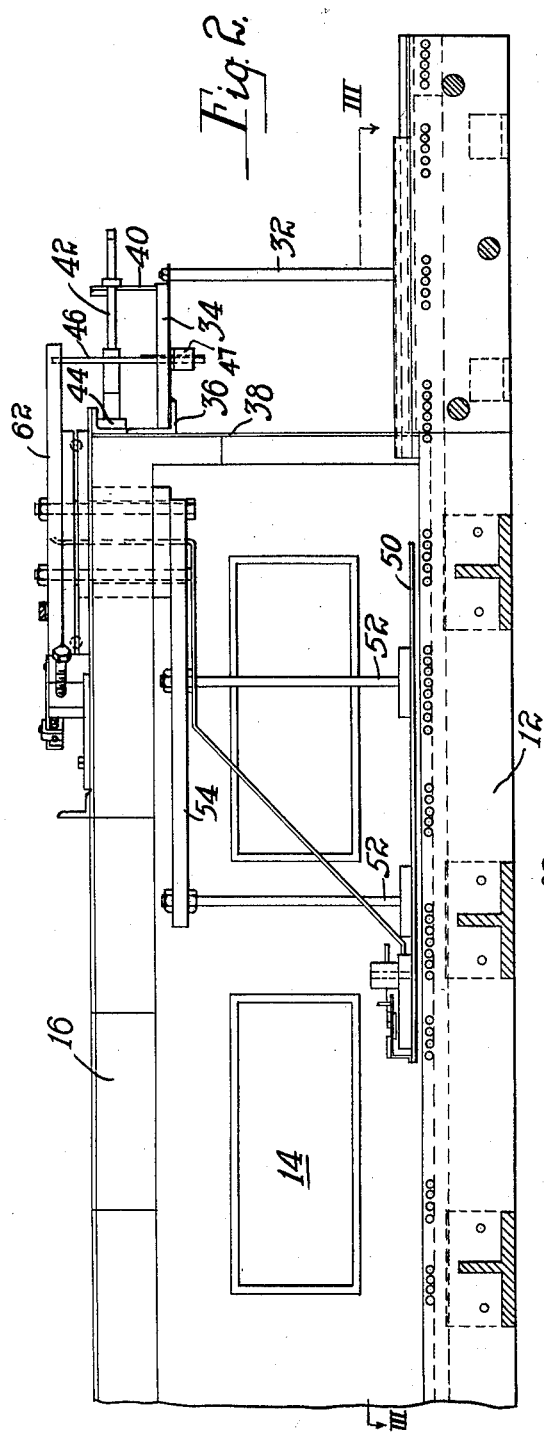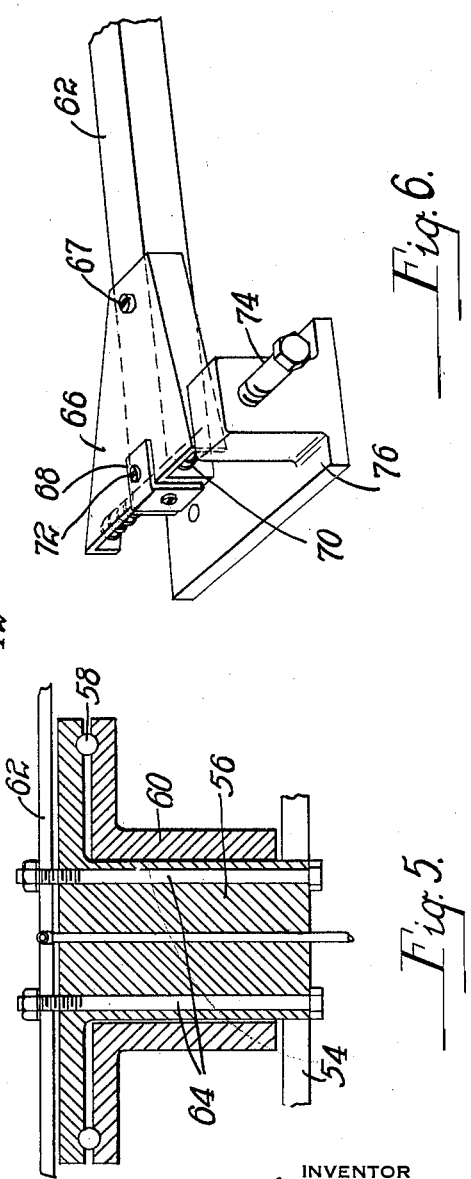

Sept. 12, 1933.  J. MAYO  1,926,593
LEER STACKER
Filed May 1, 1931  5 Sheets-Sheet 3

INVENTOR
John Mayo
By Green & McCallister
His Attorneys

Sept. 12, 1933.                    J. MAYO                    1,926,593
                                LEER STACKER
                          Filed May 1, 1931          5 Sheets-Sheet 4

INVENTOR
John Mayo
By Green & McCallister
His Attorneys

Sept. 12, 1933.   J. MAYO   1,926,593
LEER STACKER
Filed May 1, 1931   5 Sheets-Sheet 5

INVENTOR
John Mayo
By Green & McCallister
His Attorneys

Patented Sept. 12, 1933

1,926,593

UNITED STATES PATENT OFFICE 1,926,593

LEER STACKER

John Mayo, Carnegie, Pa.

Application May 1, 1931. Serial No. 534,265

24 Claims. (Cl. 198—31)

This invention relates to annealing furnaces or leers used in the manufacture of glass articles such as bottles, tumblers, fruit jars, etc., and is an improvement on the device disclosed in the United States Letters Patent No. 1,719,897, granted to me on July 9, 1929. This invention in particular relates to the distributing system which receives pieces of ware one by one from the forming machine and arranges the same in predetermined formation within the leer, preparatory to their passage through the annealing chamber.

In the above referred to patent, the distributing system for arranging the ware in rows across the conveyor of the leer operates at regular intervals regardless of the position of the ware. The number of pieces of ware in each row is governed by the speed of the oscillation of the guide arms and the speed of the conveyor which carries the ware lengthwise of the leer. It is, therefore, obvious that in such a distributing system the speed of the conveyor must be synchronized with the speed of oscillation of the arms to secure its most efficient operation.

All the other distributing devices for arranging the pieces of ware in rows crosswise of the leer now in use and known to me, are limited, more or less, in their scope of operation, since some are able to accommodate only one size of ware at a time, while others carry the majority of the pieces of ware to one side of the leer and do not give an even distribution. Also some of the ware distributing devices scratch the pieces of ware on their outer surfaces by pushing one row against the preceding row.

It is an object of the present invention to provide an oscillatory ware distributing member which automatically diverts half of the incoming ware on one side of the leer and the other half of the ware to the other side of the leer to form the crosswise row desired.

Another object of this invention is to provide a distributing system whereby the number of pieces per cross row is governed by the speed of the conveyor which carries the ware lengthwise of the leer.

A further object of this invention is to provide a distributor capable of handling simultaneously a wide variety of ware of varying diameters and shapes.

A still further object of this invention is to provide a distributor which will automatically distribute without clogging, bottles which are lying down on their sides or in groups of more than one at a time.

These and other objects which will be made apparent to those skilled in this particular art are accomplished by means of this invention, one embodiment of which is set forth in the following specification and illustrated in the accompanying drawings, wherein;

Fig. 2 is a view in side elevation of the feeding end of the leer having the side wall removed for convenience of illustration.

Fig. 5 is an enlarged view in section illustrating the mounting of the distributing device in the roof of the leer.

Fig. 6 is a view in perspective of the mechanism for adjusting the length of travel of the distributing arm.

In the several figures of the drawings like reference characters refer to like parts of the structure.

Figure 1:
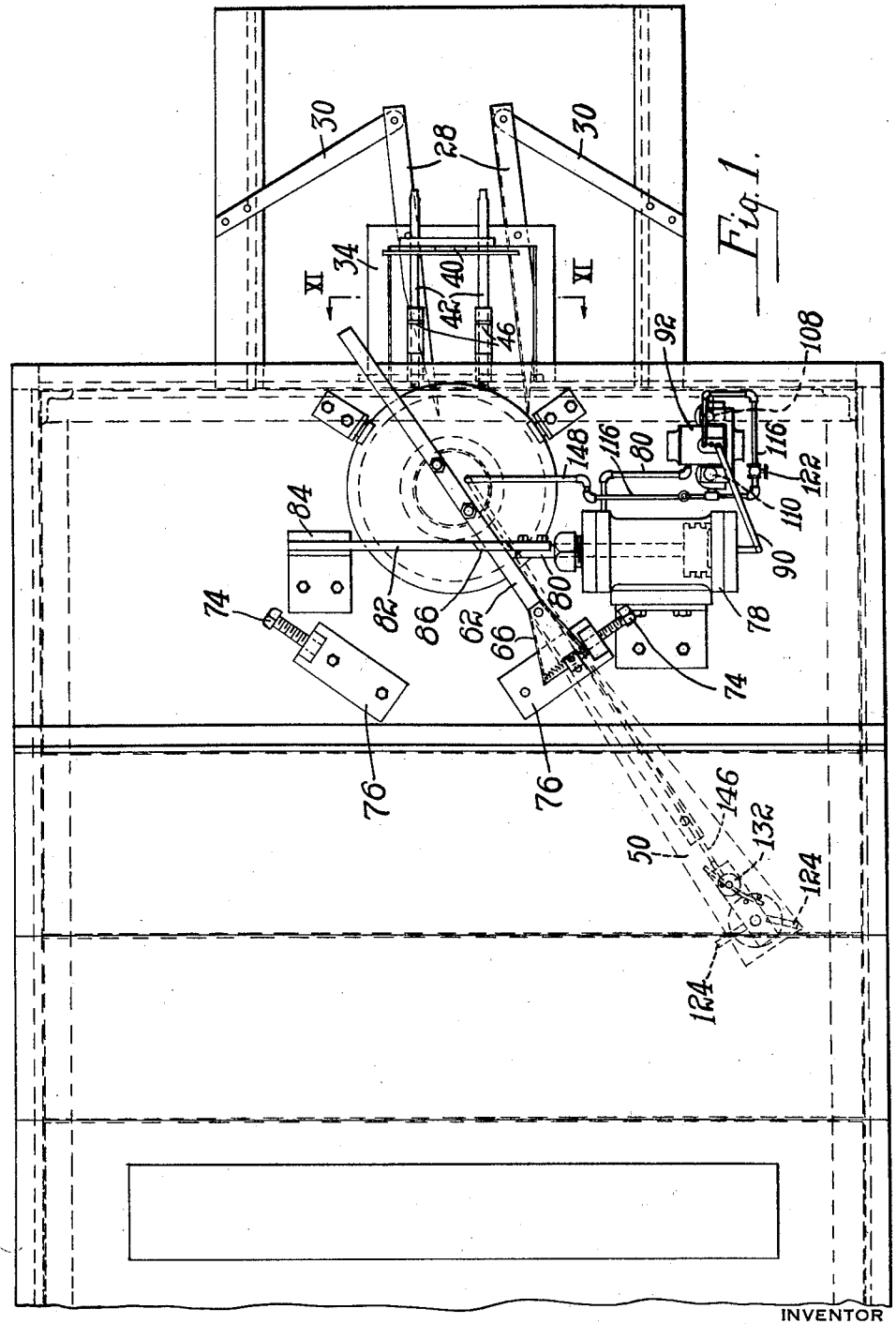
Figure 1 is a top plan view of the feeding end of the leer provided with my improved ware distributing device.
Figure 3:
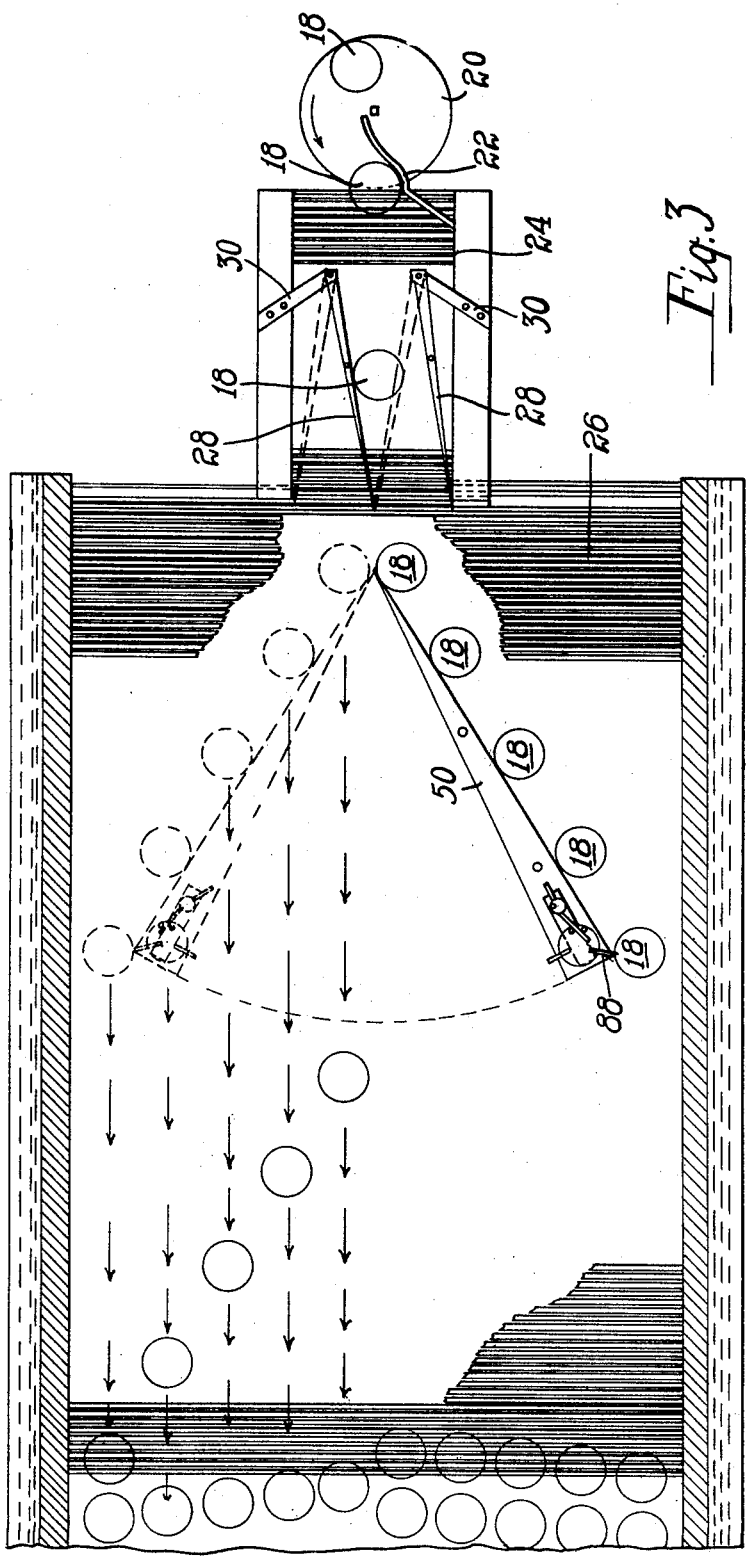
Fig. 3 is a sectional plan view taken on line III—III of Figure 2.

The leer comprises a long brick oven 10, the front portion only of which is shown, having a bottom 12, side walls 14, and a roof 16. The pieces of ware designated as 18 are received one at a time from the forming machine (not shown) on a revolving disc 20 which carries the pieces of ware around until they come in contact with an arm 22 which deflects the ware onto a narrow conveyor 24 which is an extension of the leer floor (Figs. 1, 2 and 3). The narrow conveyor 24 and the main conveyor 26 of the leer are formed of closely spaced rollers. Since the use of roller conveyors in leers is old, this description will be limited to those features necessary for the understanding of the present invention.

Figure 4:
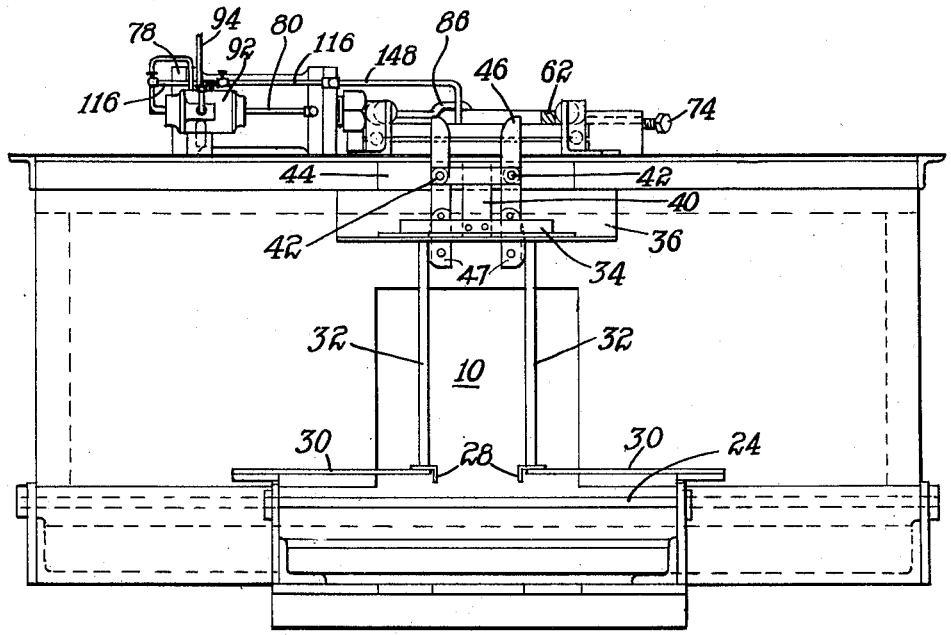
Fig. 4 is a view in end elevation of the leer with the distributing device attached.

The arm 22 deflects the ware 18 onto the center of the narrow roller conveyor 24 which carries the ware into the leer. As the ware travels across the narrow conveyor 24, it is deflected to one side or the other by guiding arms 28, one end of which is pivoted to the arms 30 extending from the side of the conveyor 24. The other ends of the arms 28 are held in position above the conveyor 24 by vertical arms 32 which are suspended from a square shaped angle member 34, one end of which rests on an angle member 36, secured to the front wall 38 of the leer (Fig. 4). The outer end of the member 34 is held in position by a T-shaped member 40 which is slidably supported on rods 42 extending outwardly from a plate 44 which is secured to the front wall 38 of the leer. The rods 42 form pivot points for swinging cams 46 which extend downwardly between the legs of member 34 and are movable into engagement therewith to slide said member and turn the ware guiding arms 28 so as to direct the ware toward one side or the other of the main conveyor 26. The mechanism for operating the cams 46 will be hereinafter explained.

The pieces of ware 18, as they leave the guiding arms 28, move onto the main conveyor 26 of the leer where they strike the side of a guiding arm 50 which deflects the pieces of ware toward the outer edges of the conveyor 26. The arm 50 is suspended from vertical rods 52 which are carried by a bar 54 secured to the end of a pivot block 56 (Fig. 5). The pivot block 56 is supported by means of a ball race 58 on a pivot member 60 which is mounted in the roof 16 of the leer. A bar 62 is mounted on the top of the block 56 and has one end extending over the front end of the leer beyond the swinging cams 46. Bolts 64 extending through openings in the block 56 and the bars 54 and 62 securely hold the bars on the block.

The opposite end of the bar 62 has a triangular spaced channel member 66 (Fig. 6) loosely pivoted thereto at 67 which forms a shock absorber for the bar. The outer end of the member 66 is held in position by an angle clip 68 secured to the end of the bar. The outer or flared end of the triangular shaped channel 66 is normally maintained in spaced relation to the bar 62 by a compression spring 70 which extends through a horizontal opening in the bar and the ends of which bear against the inside edges of the member 66. When the pivot block 56 is turned, the bar 62 is oscillated bringing the channel member 66 into contact with one of the set screws 74 which are mounted in angle members 76 secured to the roof of the leer. The shock caused by the member 66 hitting the screw 74 is absorbed by the spring 70. The set screws 74 provide an adjustment for regulating the arc through which the bar 62 may be oscillated.

The pieces of ware being carried into the leer on the conveyor 26 bear against the side of the arm 50 which deflects the pieces toward the sides of the leer. When the first piece of ware entering the leer reaches the end of the distributing arm 50, the arm is automatically oscillated or swung away from the pieces of ware bearing against it which permits the same to move straight into the leer as shown in the dotted portions in Figure 3. The rollers at the front of the feeding end of the leer are rotated faster than the remaining rollers of the conveyor as is the common practice in leer construction and, as a result of this difference in speed between the two portions of the conveyor, the ware moving straight into the leer is arranged in rows substantially crosswise of the leer.

As the deflector arm 50 is swung toward the opposite side of the leer, the guiding arms 28 are also moved about their pivot points so that the ware on the narrow conveyor 24 will be directed toward the opposite side of the leer and bear against the other side of the deflecting arm 50. The mechanism for oscillating the deflecting arm 50 and the guiding arms 28 comprise a cylinder 78 mounted on the roof 16 of the leer which operates a piston rod 80. The piston rod 80 is flattened at one end and has a bar 82 connected thereto, the outer end of which is supported in a guide block 84 mounted on the roof 16 of the leer. The guide rod 82 has a slot 86 formed therein which straddles the bar 62 and causes the bar and the deflecting arm 50 connected thereto to swing through an arc as the piston rod 80 moves in and out of the cylinder 78.

As the bar 62 is moved between the stop screws 74, the front or outer end of the bar strikes and operates one of the swinging cams 46 which slides the member 34 and the T-shaped member 40 on the support 36 and the rods 42, respectively, forcing the ware guiding arms 28 to turn about their pivot points and direct the ware on the narrow conveyor 24 toward the opposite side of the main conveyor 26. The cams 46 are so arranged that the end of the bar passes completely over both of the cams during its travel in one direction. Such a construction is necessary in order to change the position of the arms 28 as soon as the arm 50 starts moving across the leer, so that the ware on the narrow conveyor 24 will be deflected to the proper side of the leer to bear against the arm 50 in its new position.

After the bar 62 has passed completely over the cams 46 and the guiding arms 28 have been swung from one side of the conveyor 24 to the other side thereof, weights 47 on the lower ends of the cams 46, return the cams to their perpendicular position in readiness to be operated by the bar 62 when it is moved in the opposite direction. The movement of the bar 62 in the opposite direction forces the cams 46 to slide the member 34 and turn the guide arms 28 toward the other side of the conveyor.

Figures 9, 11:
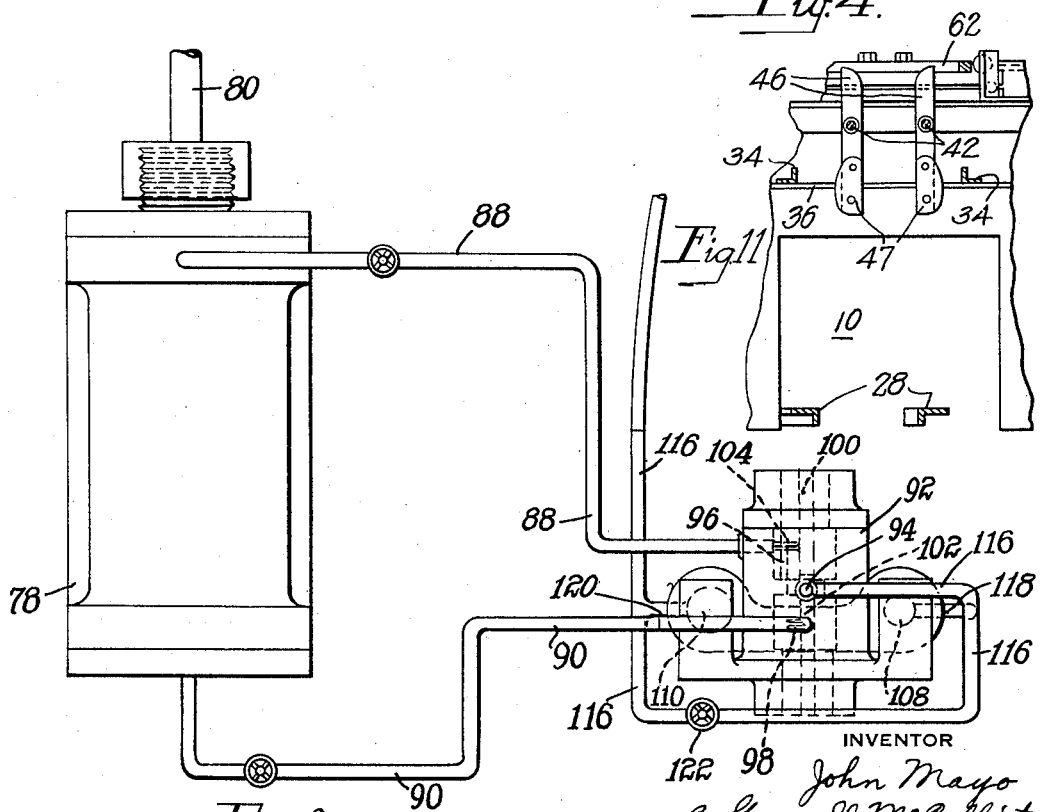
Fig. 9 is a plan view of the cylinder and rocker valve for oscillating the distributing arm.
Fig. 11 is a view taken on line XI—XI of Figure 1 showing the mechanism for operating the ware guiding arms.
Figure 10:
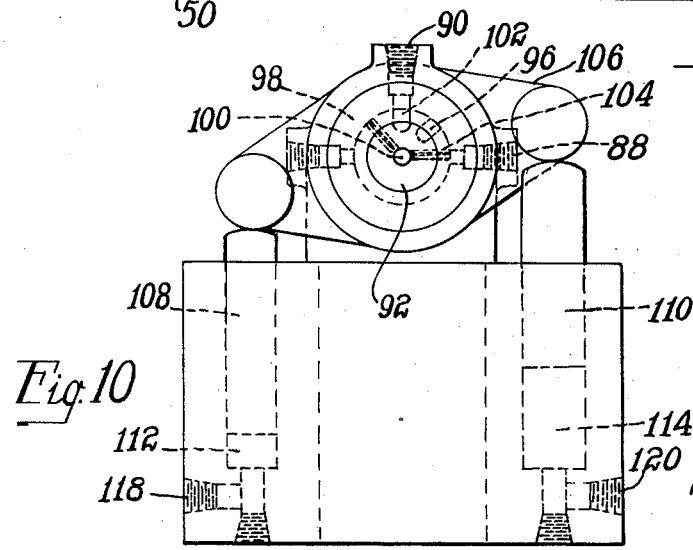
Fig. 10 is an enlarged end view of the rocker valve.

The piston rod 80 is moved back and forth in the cylinder 78 so as to oscillate the bar 62 and the deflecting arms 28 and 50 by air which is delivered to either the top or bottom of the cylinder through pipes 88 and 90, respectively (Figs. 1, 9, and 10). The pipes 88 and 90 connect the cylinder with a rocker valve 92 which is joined to a pipe 94 leading to a source of air under pressure. The rocker valve 92 has a slot 96 which establishes communication between the pipe 88 and the main air line 94 when the valve is turned in one direction so as to direct air into the top of the cylinder. When the slot 96 is in communication with the pipe 94, an opening 98 in the valve leading to an exhaust 100 formed in the valve is registering with the pipe 90 so as to permit the air in the bottom of the cylinder to be exhausted. When the valve is turned in the opposite direction, a slot 102 establishes communication between the pipe 94 and the pipe 90 which delivers air to the bottom of the cylinder. The air in the top of the cylinder is discharged through an opening 104 which leads to the exhaust 100 and which registers with the pipe 88 when air is being delivered to the bottom of the cylinder.

It is important that the ware deflecting arm 50 be moved across the leer with sufficient speed to break its contact with the ware so that the ware will move unimpeded into the leer and the last piece striking the arm will be substantially in the center of the leer. In order to control the across the leer speed of the arm 50, the pipes 88 and 90 leading to the cylinder 78 are each provided with a regulator or stop valve so that the amount of air entering and leaving the cylinder 78 may be readily controlled. This controlling of the supplying and exhausting of air makes it possible to move the piston rod 80 into and out of the cylinder at the desired speed, and consequently the arm 50 is oscillated at the proper rate of speed.

To turn the rocker valve 92 in the opposite directions so as to establish communication between the pipe 94 and one of the pipes 88 and 90, a rocker arm 106 is secured to the end of the valve, the ends of which rest upon pistons 108 and 110 mounted in cylinders 112 and 114, respectively. The piston 110 and cylinder 114 are of larger diameters than the piston 108 and cylinder 112, the purpose of which will be hereinafter explained. A pipe 116 leading from the main air supply pipe 94 has tubes 118 and 120 connecting it with the bottom of the cylinders 112 and 114, respectively. A commercial globe needle valve 122 is disposed in the pipe 116 between the lead-off tubes 118 and 120, and is so adjusted that when the pipe 116 is connected to the atmosphere there is a substantial pressure drop across the valve and an unbalanced condition is created whereby a greater force will be applied to the piston 108 than is tending to actuate the piston 110.

Figure 7:
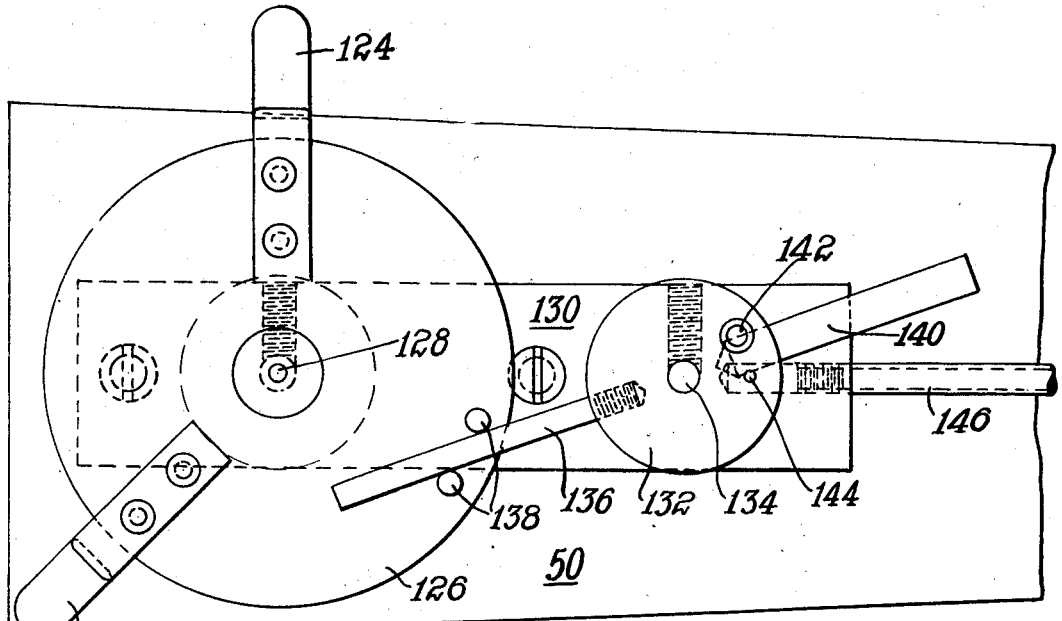
Fig. 7 is an enlarged top plan view of the end of the distributing arm.
Figure 8:
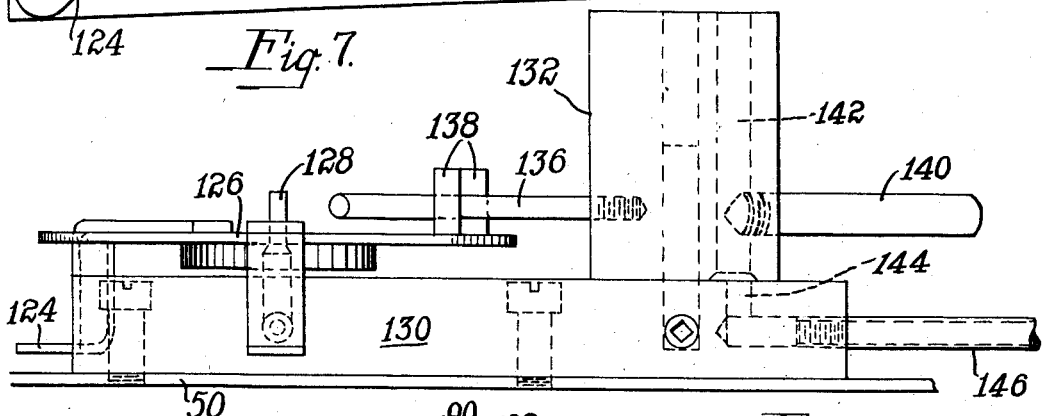
Fig. 8 is a view in side elevation of the end of the distributing arm.

The pistons 108 and 110 which operate the rocker valve 92 are actuated by impulses created by mechanism carried on the deflecting arm 50 (Figs. 7 and 8). The ware passing along the side of the arm 50 strikes a contact finger 124 carried on a circular disc 126 which is pivoted on a pin 128 extending upwardly from a block 130 mounted on the arm 50. The ware pushes the finger 124 over the arm 50 turning the disc 126 and a valve block 132 which is pivoted on a pin 134 secured to the block 130. A lever 136 extending from the valve block 132 is loosely held between pins 138 secured to the disc 126 and causes the valve block to turn with the disc. The valve block 132 is balanced by a pin 140 which extends therefrom on the side opposite the lever 136.

The valve block is provided with a longitudinally extending opening or vent 142 which is moved into and out of communication with an opening 144 in the block 130. A tube 146 which is in communication with the opening 144 has one end extending upwardly through the pivot block 56 where it is joined to the pipe 116 by a hose 148.

Assuming that the ware is being deflected toward the left edge of the conveyor 26, as shown in Fig. 3, when the first piece of ware 18 strikes the finger 124, the valve block 132 is moved to the position illustrated in Fig. 7 which closes the opening 144. This closing of the opening 144 causes the air pressure to build up in the tubes 116 until it is substantially the same on both sides of the needle valve 122. Since the pressure per unit area under the piston 110 is substantially the same as the pressure per unit area tending to actuate the piston 108, and since the area of the piston 110 is greater than the area of the piston 108, it is apparent that the product of the pressure per unit area and the area of the piston 110 will exceed the product of the pressure per unit area and the area of the piston 108, consequently the piston 110 will be raised and will turn the rocker valve 92 to establish communication between the slot 102 and the tube 90 so that air is supplied to the bottom of the cylinder 78. The piston rod 80 is then operated and the arm 50 and deflecting arms 28 are moved so as to deflect the incoming ware toward the right side of the leer. When the valve block 132 is moved so that the vent 142 is in communication with the opening 144, and the tube 146 is connected to the atmosphere, the pressure in pipe 116 on the side of the needle valve 122 to which the cylinder 114 is connected falls below the pressure in the pipe 116 on the opposite side due to the setting of the valve 122. The pressure tending to actuate the piston 108 therefore, is greater than the pressure in the cylinder 114 by the amount of the pressure drop across the needle valve 122. The valve 122 is set so that when the tube 116 is open to the atmosphere, the product of the pressure per unit area and the area of the piston 108 will exceed the product of the pressure per unit area and the area of the piston 110, consequently the piston 108 is raised which turns the rocker valve so that the slot 96 is in communication with the tube 88 leading to the top of the cylinder 78 and the deflecting arms 50 and 28 are thereby moved to the right side of the leer through the mechanism associated with the piston rod 80.

*Operation*

The pieces of ware 18 are wiped off the disc 20 onto the narrow conveyor 24 where they pass between the guide arms 28 which direct the pieces of ware toward one side of the leer. For convenience of illustration, the operation of the distributing system will be explained first in the position as shown in Figure 3.

When in this position, the vent 142 in the valve block 132 is registering with the opening 144 formed in the block 130 permitting the air in the tubes 146 and 116 to be discharged through the vent. The air pressure, under such circumstances is greater in the cylinder 110 than in the cylinder 112 and the piston 108 is in its raised position. The rocker valve 92 is turned so that air is delivered through the pipe 88 into the top of the cylinder 78 which holds the piston rod 80 in its down position and maintains the deflecting arm 50 in the position shown in Figure 3.

The ware, as it leaves the guiding arm 28, is received on the conveyor 26 of the leer which carries the pieces of ware through the leer. As the pieces of ware 18 move across the conveyor 26 they come in contact with the deflector arm 50 which pushes them toward the left side of the leer as shown.

When the first piece of ware passes the end of the arm 50 it strikes the contact finger 124 which turns the disc 126 and the valve block 132 breaking the communication between the opening 144 and the vent 142. The valve block, therefore, closes the opening 144 and causes the pressure in the tube 146 and the pipe 116 to build up until the pressure in the large cylinder 114 is greater than in the small cylinder 112, which raises the piston 110 and turns the rocker arm 106 forcing the piston 108 back into the cylinder 112. The rocker arm 106 turns the rocker valve 92 and brings the slot 102 into communication with the tube 90 and the opening 104 into communication with the tube 88. Air is then delivered to the bottom of the cylinder 78 which forces the piston rod 80 outwardly, swinging the bar 62 carrying the arm 50 toward the opposite side of the leer. As the piston rod 80 moves outwardly, the air in the top of the cylinder 78 is forced through the tube 88 and opening 104 into the exhaust 100.

As the bar 62 is swung toward the right side of the leer, the outer end thereof strikes the swinging cams 46 which move the member 34 and shift the arms 28 toward the right side of the leer. The arms 28 and 50 then deflect the ware toward the right side of the leer and are held in that position until a piece of ware has reached the end of the arm 50. As the first piece of ware travelling toward the right side of the leer passes the end of the arm 50, it operates the contact finger 124 which turns the valve block 132 and reestablishes communication between the vent 142 and the opening 144. As soon as the vent 142 is in communication with the opening 144, the pressure in the cylinder 114 drops below the pressure in the cylinder 112 which causes the piston 108 to be raised and rock the valve 92 which reverses the direction of the air going into the cylinder 78. The air now being directed into the top of the cylinder 78 forces the piston rod 80 back into the cylinder which moves the bar 62 and the deflecting arms 50 and 28 back to their original positions.

It is readily apparent from the foregoing description, that my distributing device automatically directs half of the ware entering the leer to one side thereof and the other half toward the opposite side, and the number of pieces of ware in each cross row depends on the speed of the leer conveyor. It is also apparent that the device is capable of handling simultaneously ware of any shape, or size, and that the cross rows will be evenly spaced and not forced against one another.

While I have described one embodiment of my invention, it is to be understood that this invention is not limited to the construction herein specifically illustrated but can be embodied in other forms without departure from the spirit of this invention and the scope of the appended claims.

What I claim as new and desire to secure by Letters Patent is:

1. The combination with a leer, of a ware distributing arm in said leer and having an air vent therein through which air is exhausted, a conveyor for moving pieces of glassware into said leer and against said arm, reciprocating means for swinging said arm from one side to the other of said conveyor, means for reversing said reciprocating means, and means operable by the moving ware for alternately opening and closing the air vent in said arm for operating said reversing means, whereby the arm is intermittently swung from side-to-side in said leer and the moving ware arranged in fractional rows crosswise of the leer.

2. The invention as set forth in claim 1, in which a cylinder, piston, and piston rod are provided for swinging said arm back and forth across the leer.

3. The invention as set forth in claim 1, in which a ware operated valve adapted to alternately open and close said air vent is connected to a reversing valve which in turn is connected to a cylinder, are provided for swinging said ware deflecting arm intermittently back and forth across the leer.

4. In a leer, in combination, a pair of guide arms pivoted outside said leer, a guide arm suspended inside said leer, means for feeding pieces of glassware one by one to the space between said outside arms and against the edge of the arm inside said leer, and means for oscillating said guide arms whereby the pieces of ware are arranged at spaced intervals across the leer.

5. The invention as set forth in claim 4, in which means is provided for adjusting the travel of said guide arms.

6. The invention as set forth in claim 4, in which a cylinder, piston and piston rod are provided for oscillating said guide arms intermittently back and forth across the leer.

7. The invention as set forth in claim 4, in which an inside ware operated valve connected to an outside reversing valve which in turn is connected to a cylinder are provided for oscillating said guide arms intermittently back and forth across the leer.

8. In a leer, in combination, a conveyor for feeding ware into and through said leer, a ware distributing device having an arm suspended over said conveyor and engaging the ware carried on said conveyor, a cylinder having a piston provided with a rod for operating said ware distributing device so as to swing said arm back and forth across said conveyor, and ware operated means for controlling the operation of the piston in said cylinder.

9. In a leer, in combination, a conveyor for feeding ware into and through said leer, a ware distributing device having an arm suspended over said conveyor and engaging the ware carried on said conveyor, means for intermittently oscillating said ware distributing device so as to swing said arm back and forth across said conveyor, and means inside said leer for controlling the operation of said oscillating means, including a valve pivotally mounted on said arm and a contact finger actuated by the ware on said conveyor for turning said valve.

10. In a leer, in combination, a conveyor for feeding ware into and through said leer, a ware distributing device having an arm suspended over said conveyor and engaging the ware carried on said conveyor, means for oscillating said ware distributing device so as to swing said arm back and forth across said conveyor, a reversing valve controlling said oscillating means, and ware actuated means for creating an unbalanced condition in said reversing valve so as to intermittently operate said oscillating means.

11. The combination with a leer, of a conveyor for carrying pieces of glassware into and through said leer, a ware deflecting arm suspended in said leer above said conveyor, pressure responsive mechanism for turning said arm, and means carried by said arm for actuating said pressure responsive mechanism.

12. The combination with a leer, means for conveying pieces of glassware into and through said leer, an arm for deflecting a plurality of pieces of ware toward one side of said leer, means for oscillating said arm to move it out of contact with the deflected ware and to place the opposite side of the arm in position to deflect a plurality of pieces of ware toward the opposite side of said leer and means for reversing said arm oscillating means when a plurality of pieces have been deflected toward either side of said leer.

13. The combination with a leer, of a conveyor for carrying pieces of glassware into and through said leer, a ware deflecting arm suspended in said leer above said conveyor, pressure responsive mechanism for turning said arm and a ware operated valve on said arm for actuating said pressure responsive mechanism.

14. The combination with a leer, of a conveyor for carrying pieces of glassware into and through said leer, an arm for deflecting the pieces of ware on said conveyor toward one side of said leer, mechanism for turning said arm to deflect the oncoming ware toward the opposite side of the leer, a reversing valve connected to said arm turning mechanism, and a valve for creating an alternative overbalanced condition in said reversing valve so as to actuate said arm turning mechanism.

15. The combination with a leer, of a conveyor for feeding pieces of glassware into and through said leer, means outside said leer for directing the ware toward one side of said conveyor, means inside said leer for directing the ware on said conveyor toward one side of the leer, pressure responsive mechanism swinging both of said ware directing means across said conveyer and leer, reversing means connected to the pressure responsive mechanism and means for actuating said reversing means to operate said pressure responsive mechanism.

16. The combination with a leer, of a conveyor for feeding pieces of glassware into and through said leer, guide arms outside said leer for directing the pieces of ware toward one side of the conveyor, a member in said leer for directing the pieces of ware on said conveyor toward one side of said leer, and means for intermittently oscillating said guide arms and said member.

17. A leer stacker comprising a ware deflecting arm adapted to extend into a leer, a reciprocating device for swinging said arm back and forth across said leer, a reversing valve connected to said reciprocating device, a pair of cylinders each having a piston therein, one of which is larger in diameter than the other, associated with said reversing valve, a pressure supply line connecting said cylinders in parallel to a common source of pressure and normally exhausting beyond said cylinders, a reducing valve interposed in said pressure supply line between said cylinders, and means on said arm for opening and closing the exhaust of said pressure supply line to alternately balance and unbalance, respectively, the intensity of pressure in said cylinders.

18. A leer stacker comprising a ware deflecting arm having an air vent therein, a reciprocating device for moving said ware deflecting arm, a reversing valve connected to said reciprocating device, a pair of cylinders each having a piston therein for operating said reversing valve, one of said pistons being of larger diameter than the other, a pressure supply line connecting said cylinders in parallel to a common source of pressure and leading to the vent in said arm, a reducing valve interposed in said pressure supply line between said cylinders and a ware-operated valve on said arm adapted to alternately open and close said vent to unbalance and balance, respectively, the intensity of pressure in said cylinders.

19. Mechanism for operating the reciprocating device of a leer stacker, comprising means for reversing said reciprocating device, a pair of cylinders each having a piston therein, one of which is larger in diameter than the other, for actuating said reversing means, said cylinders being connected in parallel to a line carrying a common source of pressure supply, a reducing valve interposed in said line between said cylinders, and means for opening and closing the line at a point remote from said cylinders to alternately unbalance and balance the intensity of pressure in the two cylinders.

20. A leer stacker comprising a ware deflecting arm having an air vent therein, a reciprocating device for moving said arm, a reversing valve connected to said reciprocating device, a pair of cylinders associated with said reversing valve each having a piston therein, one of which is of larger diameter than the other, a pressure supply line connecting in parallel each of said cylinders to a common source of pressure supply and leading to the air vent in said arm, a reducing valve interposed in said pressure supply line between said cylinders, a block having an opening therein pivotally mounted on said arm, and means for turning said block first in one direction and then in the other to move said opening into and out of register with said air vent to unbalance and balance, respectively, the intensity of pressure in said cylinders.

21. The combination with a leer, of a conveyor for feeding ware into and through said leer, an arm suspended over said conveyor for deflecting the ware toward one side of the leer, a motor for moving said arm across the leer, means for operating the motor in opposite directions to swing said arm back and forth across the leer, and means operated by the ware moving along said arm for actuating said motor operating means.

22. The combination with a leer, of a conveyor for feeding ware into and through said leer, an arm suspended over said conveyor for deflecting the ware toward one side of the leer, an air motor for moving said arm across the leer, a valve for reversing the delivery of air to said motor, means for intermittently actuating said reversing valve to cause the arm to be moved back and forth across the leer, and means for controlling the across the leer stroke of said arm.

23. The combination with a leer having a ware deflecting arm and an air motor for moving said arm across said leer, of a valve for reversing the delivery of air to said motor having a rocker shaft provided with a recess to which air is continuously supplied, slots leading from opposite sides of said recess and a series of openings formed in said shaft, said slots and openings being so spaced that when the shaft is turned in one direction, one of said slots is connected to one end of the motor and one of said openings is connected to the opposite end of said motor, and means for turning said rocker shaft to alternately connect opposite ends of the cylinder to the supply of air.

24. The combination with a leer, of a conveyor for feeding ware into said leer, an arm suspended over said conveyor for deflecting the ware toward one side of the leer, an air motor operatively connected to said arm, a reversing valve connected to said air motor for delivering air first to one end and then to the other end thereof, mechanism for actuating said reversing valve, and ware operated means for actuating the mechanism controlling said reversing valve each time a piece of ware passes the end of said arm.

JOHN MAYO.